United States Patent Office 3,433,709
Patented Mar. 18, 1969

3,433,709
BIOLOGICAL TRANSFORMATION OF α-6-DEOXY-TETRACYCLINES TO TETRACYCLINES
Jerry Robert Daniel McCormick, Spring Valley, N.Y., and Newell Oscar Sjolander, Saddle River, N.J., assignors to American Cyanamid Company, Stamford, Conn., a corporation of Maine
No Drawing. Filed Dec. 7, 1965, Ser. No. 512,196
U.S. Cl. 195—80    9 Claims
Int. Cl. C12k 1/00; C07c 103/26

ABSTRACT OF THE DISCLOSURE

This disclosure describes a process for biologically transforming a 6-deoxytetracycline having a β-6-hydrogen substituent to the corresponding tetracycline with a strain of the genus *Streptomyces aureofaciens*.

---

This invention relates to a new process for producing tetracyclines and, more particularly, is concerned with a novel process for biologically transforming a 6-deoxytetracycline having a β-6-hydrogen substituent to the corresponding tetracycline as set forth in the following reaction scheme:

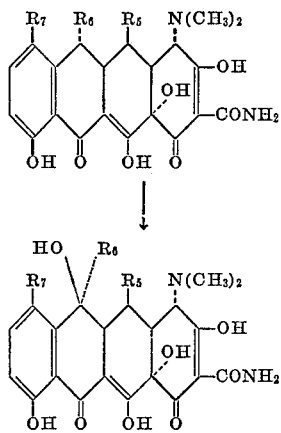

wherein $R_5$ is hydrogen or hydroxyl; $R_6$ is hydrogen or methyl; and $R_7$ is hydrogen, fluorine, chlorine or bromine.

Our invention is based upon the discovery that it is possible to effect the biological transformation of α-6-deoxytetracyclines to tetracyclines. The method of the present invention, in its broader aspects, comprises the biological β-hydroxylation at the 6-position of the α-6-deoxytetracyclines. This transformation is accomplished by adding a 6-deoxytetracycline having a β-6-hydrogen substituent to a fermentation medium inoculated with a strain of the genus *Streptomyces aureofaciens*, and mutants derived therefrom. Among the strains of *S. aureofaciens* which will introduce a β-hydroxyl group at the 6-position of the α-6-deoxytetracycline molecule are the following:

S. aureofaciens _____ ATCC 10762a
S. aureofaciens _____ ATCC 13192
S. aureofaciens _____ NRRL 3013
S. aureofaciens _____ ATCC 12551
S. aureofaciens _____ ATCC 13908
S. aureofaciens _____ ATCC 12416c Representative α-6-deoxytetracyclines which may be biologically transformed by the method of the present invention with a strain of the genus *Streptomyces aureofaciens*, and mutants derived therefrom, are, for example, (1) α-6-deoxytetracycline, (2) 6-demethyl-6-deoxytetracycline, (3) 6-demethyl-7-fluoro-6-deoxytetracycline, (4) 5-hydroxy-α-6-deoxytetracycline, (5) 7-chloro-5-hydroxy-α-6-deoxytetracycline, (6) 5-hydroxy-6-demethyl-α-6-deoxytetracycline, and (7) 7-bromo-5-hydroxy-6-demethyl-6-deoxytetracycline whereby there is obtained (1) tetracycline, (2) 6-demethyltetracycline, (3) 6-demethyl-7-fluorotetracycline, (4) 5-hydroxytetracycline, (5) 7-chloro-5-hydroxytetracycline, (6) 5-hydroxy-6-demethyltetracycline, and (7) 7-bromo-5-hydroxy-6-demethyltetracycline, respectively.

It is most surprising that the 6-deoxytetracyclines having a β-6-hydrogen substituent can serve as substrates which can be acted upon by the microorganism so as to transform the α-6-deoxytetracyclines to the corresponding tetracyclines. In the normal fermentation, the ingredients of the nutrient medium serve as the substrate from which the antibiotic is synthesized. It is unexpected to discover that chemical compounds as structurally stable as the α-6-deoxytetracyclines may serve as the substrates for producing various tetracyclines.

The conditions of the fermentation for the biological conversion of the α-6-deoxytetracyclines to tetracyclines are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable sources of carbon such as the polysaccharides or starches, or polyalcohols such as glycerol may be used. An assimilable source of nitrogen may be supplied through the use of proteins, protein hydrolysates, urea, corn steep liquor, metal extracts, peptone, distillers solubles, fish meal and other conventional substances. The common anions and cations are supplied in the form of their non-toxic salts. Trace elements such as manganese, cobalt, zinc, copper, etc. are obtained either as impurities in the above compounds, or through the use of tap water or by specifically adding solutions especially enriched with these trace elements.

The other general conditions of the fermentation such as hydrogen ion concentration, temperature, time, rate of aeration, preparation of the inoculum, sterilization, inoculation and the like are conventional and are similar to those for the production of other tetracyclines as set forth in the aforementioned U.S. Patents to Dugger, Minieri et al. and McCormick et al.

The fermentation is allowed to proceed under normal conditions for 24 to 60 hours which is the time normally required to obtain good growth of the *S. aureofaciens* culture. The α-6-deoxytetracycline starting material is then added to the fermentation at any desired concentration, although for practical reasons an α-6-deoxytetracycline substrate at a concentration of up to about 10 grams per liter of medium is satisfactory although higher concentrations may be used with some sacrifice in yield. The addition of the α-6-deoxytetracycline starting materials may be accomplished in any suitable manner so long as it promotes contact of the α-6-deoxytetracycline with the biological medium. To this end, it is preferred to add the α-6-deoxytetracycline starting material in a solvent such as water, dimethylformamide, dimethylacetamide, dimethylsulfoxide and tetramethylenesulfoxide. However, a solution of the α-6-deoxytetracycline in water or dimethylsulfoxide is the most preferred solvent for the α-6-deoxytetracycline starting material. After the fermentation has been continued for a suitable time, for example, from 96 to 120 hours, and the transformation of the α-6- deoxytetracycline to the desired tetracycline is substantially complete, the tetracycline product may be separated from the fermentation mash in any convenient manner. The fermentation process may be selected from any of the numerous isolation techniques now well known in the art.

The α-6-deoxytetracyclines, the starting materials for the novel process of the present invention, may be prepared either by total synthesis as described by Conover et al., J.A.C.S., 84, 3222–3224 (1962), or by hydrogenolysis of 6-demethyltetracyclines as described by McCormick et al. in U.S. Patent 3,019,260, or by reduction of the 6-methylene-6-deoxy - 6 - demethyltetracyclines as described by Blackwood et al. in U.S. Patent 3,200,149. Transformations at the 7-position of the α-6-deoxytetracyclines may be accomplished as described in U.S. Patent 3,036,129 to Hlavka et al. or as described by Hlavka et al., J. Org. Chem. 27, 3674–3677 (1962). The principle advantage of this process lies in the fact that substitutions at the 7-position which have been made in the relatively stable 6-β-unsubstituted tetracycline derivatives are capable of surviving the fermentation herein described without alteration. As pointed out by Stephens et al. (J.A.C.S., 85, 2643–2651 (1963), 6-Deoxytetracyclines, IV, Preparation, C–6 Stereochemistry and Reactions), tetracyclines containing the 6-hydroxy group present a problem of instability which limits the scope of the chemical reactions which may be applied. However, the tetracycline derivatives possessing a 6-hydroxy group which are normally produced by fermentative biosynthesis (i.e., 7 - chlorotetracycline, 7 - chloro-6-demethyltetracycline, tetracycline and 5-hydroxytetracycline) are the preferred derivatives for therapeutic use. Thus, for example, the process herein described provides, for the first time, a means of preparing the compound 6-demethyl-7-fluorotetracycline. Prior to the preparation of 6-demethyl-6-deoxy-7-fluorotetracycline and the application of this compound to the instant process, all attempt to fluorinate a tetracycline had failed due to the inability of the compounds containing the 6-hydroxyl group to survive the rigorous fluorination conditions without alteration of the molecule.

The invention will be described in greater detail in conjunction with the following specific examples.

EXAMPLE 1

Biological conversion of 6-demethyl-6-deoxytetracycline to 6-demethyltetracycline Spores of *S. aureofaciens* strain ATCC No. 13192 were washed from an agar slant with sterile distilled water to form a suspension containing 60 million to 80 million spores per ml. A 0.33 ml. portion of this suspension was used to inoculate an 8 inch test tube containing 8 ml. of a medium prepared according to the following formulation:

| | |
|---|---|
| Sucrose _____grams__ | 30 |
| Ammonium sulfate _____do____ | 2 |
| Calcium carbonate _____do____ | 7 |
| Cornsteep liquor _____milliliters__ | 20 |

Tap water, q.s. to 1000 milliters.

Prior to inoculation, the medium was sterilized by autoclaving for 20 minutes under a pressure of 15 pounds per square inch. The inoculated tube was incubated for 24 hours at 28° C. on a reciprocating shaker operating at 116 oscillations per minute, whereby an inoculum of the *S. aureofaciens* was obtained.

A fermentation medium of the following composition was prepared:

| | |
|---|---|
| Corn flour _____grams__ | 14.5 |
| Corn steep _____milliliters__ | 25.0 |
| Calcium carbonate _____grams__ | 9.0 |
| Ammonium sulfate _____do____ | 6.72 |
| Ammonium chloride _____do____ | 2.0 |
| Manganese sulfate _____gram__ | 0.10 |
| Cobaltous chloride _____gram__ | 0.005 |
| Corn starch _____grams__ | 52.5 |

Water, q.s. to 1000 milliliters.

After sterilization of this medium in an autoclave for 20 minutes at a pressure of 15 pounds per square inch, 25 ml. portions of 250 ml. Erlenmeyer flasks were inoculated with 1.0 ml. portions of the *S. aureofaciens* inoculum. The fermentation was carried out for 48 hours at 25° C. on a rotary shaker operating at 180 r.p.m. At this time a 10 ml. portion of the partially fermented mash was added to a sterile 125 ml. flask containing 6.34 mg. of 6-demethyl - 6 - deoxytetracycline. The fermentation was then continued for an additional 72 hours at 25° C. At this time chromatographic analysis of the mash showed the presence of 6-demethyltetracycline. A control fermentation carried out in the same manner but without added 6-demethyl-6-deoxytetracycline showed no 6-demethyltetracycline.

EXAMPLE 2

Biological conversion of 6-demethyl-6-deoxytetracycline to 6-demethyltetracycline The procedure of Example 1 was followed with these exceptions: A 10 ml. portion of a partially fermented (48 hour) mash of *S. aureofaciens* strain NRRL 3013 was transferred to a sterile 125 ml. flask containing 6.60 mg. of 6-demethyl-6-deoxytetracycline. The fermentation was then continued for an additional 72 hours at 25° C. At this time chromatographic analysis of the mash showed the presence of 6-demethyltetracycline. A control fermentation carried out in the same manner but without added 6-demethyl-6-deoxytetracycline showed no 6 - demethyltetracyline.

EXAMPLE 3

Biological conversion of 6-demethyl-6-deoxy-7-fluorotetracycline to 6-demethyl-7-fluorotetracycline The procedure of Example 1 was followed with these exceptions: A 25 ml. portion of a partially fermented (24 hour) mash of *S. aureofaciens* strain NRRL 3013 was added to a sterile 250 ml. flask containing a mixture of 3.0 mg. of 6-demethyl-6-deoxy-7-fluorotetracycline, 1.0 ml. of dimethylsulfoxide and 30 mg. of magnesium acetate. The fermentation was then continued for an additional 96 hours at 25° C. At this time chromatographic analysis of the mash showed the presence of 6-demethyl-7-fluorotetracycline. A control fermentation carried out in the same manner but without added 6-demethyl-6-deoxy-7-fluorotetracycline showed no 6 - demethyl-7-fluorotetracycline.

EXAMPLE 4

Biological conversion of α-6-deoxy-7-chloro-5-hydroxytetracycline to 7-chloro-5-hydroxytetracycline The procedure of Example 1 was followed with these exceptions: A 25 ml. portion of a partially fermented (24 hour) mash of *S. aureofaciens* strain NRRL 3013 was added to a sterile 250 ml. flask containing a mixture of 3.0 mg. of α-6-deoxy-7-chloro-5-hydroxytetracycline hydrochloride in 2.0 ml. of water. The fermentation was then continued for an additional 96 hours at 25° C. At this time chromatographic analysis of the mash showed the presence of 7-chloro-5-hydroxytetracycline. A control fermentation carried out in the same manner but without added α-6-deoxy-7-chloro-5-hydroxytetracycline showed no 7-chloro-5-hydroxytetracycline.

EXAMPLE 5

Biological conversion of 7-chloro-6-demethyl-6-deoxytetracycline to 7-chloro-6-demethyltetracycline The procedure of Example 1 was followed with these exceptions: A 25 ml. portion of a partially fermented (24 hour) mash of *S. aureofaciens* strain NRRL 3013 was added to a sterile 250 ml. flask containing a mixture of 3.45 mg. of 7-chloro-6-demethyl-6-deoxytetracycline, 1.0 ml. of dimethylsulfoxide and 30 mg. of magnesium acetate. The fermentation was then continued for an additional 96 hours at 25° C. At this time chromatographic analysis of the mash showed the presence of 7-chloro-6-demethyltetracycline. A control fermentation carried out in the same manner but without added 7-chloro-6-demethyl-6-deoxytetracycline showed no 7-chloro-6-demethyltetracycline.

EXAMPLE 6

Biological conversion of 7-bromo-6-demethyl-6-deoxytetracycline to 7-bromo-6-demethyltetracycline The procedure of Example 1 was followed with these exceptions: A 25 ml. portion of a partially fermented (24 hour) mash of *S. aureofaciens* strain NRRL 3013 was added to a sterile 250 ml. flask containing a mixture of 3.0 mg. of 7-bromo-6-demethyl-6-deoxytetracycline, 1.0 ml. of dimethylsulfoxide and 30 mg. of magnesium acetate. The fermentation was then continued for an additional 96 hours at 25° C. At this time chromatographic analysis of the mash showed the presence of 7-bromo-6-demethyltetracycline. A control fermentation carried out in the same manner but without added 7-bromo-6-demethyl-6-deoxytetracycline showed no 7-bromo-6-demethyltetracycline.

What is claimed is:

1. The process of producing tetracyclines of the formula:

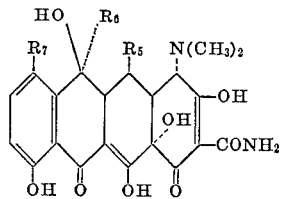

wherein $R_5$ is selected from the group consisting of hydrogen and hydroxyl; $R_6$ is selected from the group consisting of hydrogen and methyl; and $R_7$ is selected from the group consisting of hydrogen, fluorine, chlorine and bromine; which comprises adding an α-6-deoxytetracycline of the formula:

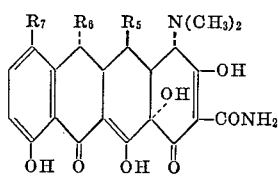

wherein $R_5$, $R_6$ and $R_7$ are as hereinabove defined to an aqueous nutrient medium, aerobically fermenting the aqueous nutrient medium with a strain of *Streptomyces aureofaciens*, and continuing the fermentation until the α-6-deoxytetracycline is substantially converted to the corresponding tetracycline.

2. A process according to claim 1 in which the strain of *Streptomyces aureofaciens* employed is ATCC 10762a.

3. A process according to claim 1 in which the strain of *Streptomyces aureofaciens* employed is ATCC 13192.

4. A process according to claim 1 in which the strain of *Streptomyces aureofaciens* employed is NRRL 3013.

5. A process according to claim 1 in which $R_5$ is hydrogen, $R_6$ is methyl and $R_7$ is hydrogen.

6. A process according to claim 1 in which $R_5$ is hydrogen, $R_6$ is hydrogen and $R_7$ is hydrogen.

7. A process according to claim 1 in which $R_5$ is hydrogen, $R_6$ is hydrogen and $R_7$ is fluorine.

8. A process according to claim 1 in which $R_5$ is hydrogen, $R_6$ is hydrogen and $R_7$ is chlorine.

9. A process according to claim 1 in which $R_5$ is hydroxyl, $R_6$ is methyl and $R_7$ is chlorine.

References Cited

UNITED STATES PATENTS

| | | | |
|---|---|---|---|
| 2,965,546 | 12/1960 | McCormick et al. | 195—80 |
| 3,023,148 | 2/1962 | Miller et al. | 195—80 |
| 3,160,661 | 12/1964 | McCormick | 260—559 |
| 3,226,305 | 12/1965 | McCormick et al. | 195—80 |

MAURICE W. GREENSTEIN, *Primary Examiner.*

U.S. Cl. X.R.

260—559